July 28, 1970  J. C. ORKNEY  3,521,614
RECIPROCATING MACHINES

Filed Sept. 29, 1967  7 Sheets-Sheet 1

Inventor
JOHN CARNEGIE ORKNEY
By Mason, Fenwick & Lawrence
Attorneys

July 28, 1970          J. C. ORKNEY          3,521,614
RECIPROCATING MACHINES
Filed Sept. 29, 1967          7 Sheets-Sheet 3
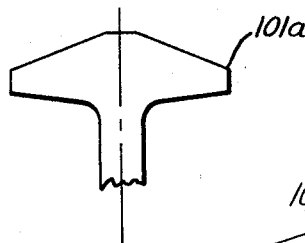
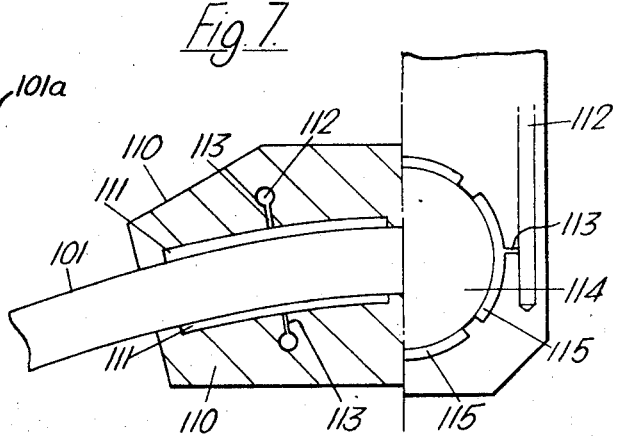
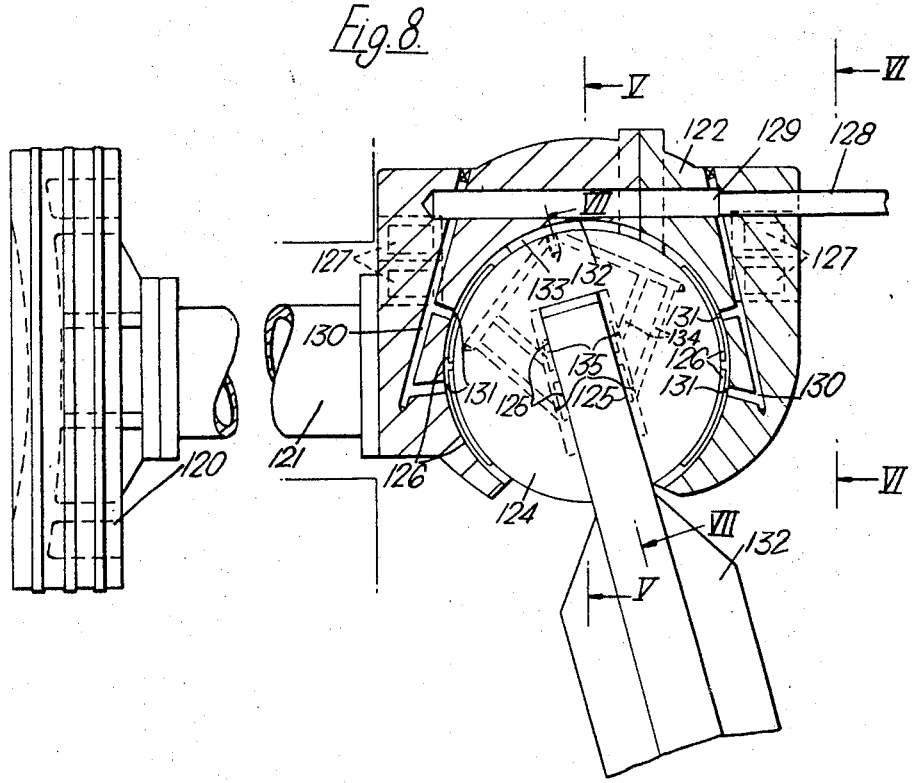
Inventor
JOHN CARNEGIE ORKNEY
By Mason, Fenwick & Lawrence
Attorney Inventor
JOHN CARNEGIE ORKNEY
By Mason, Fenwick & Lawrence
Attorneys

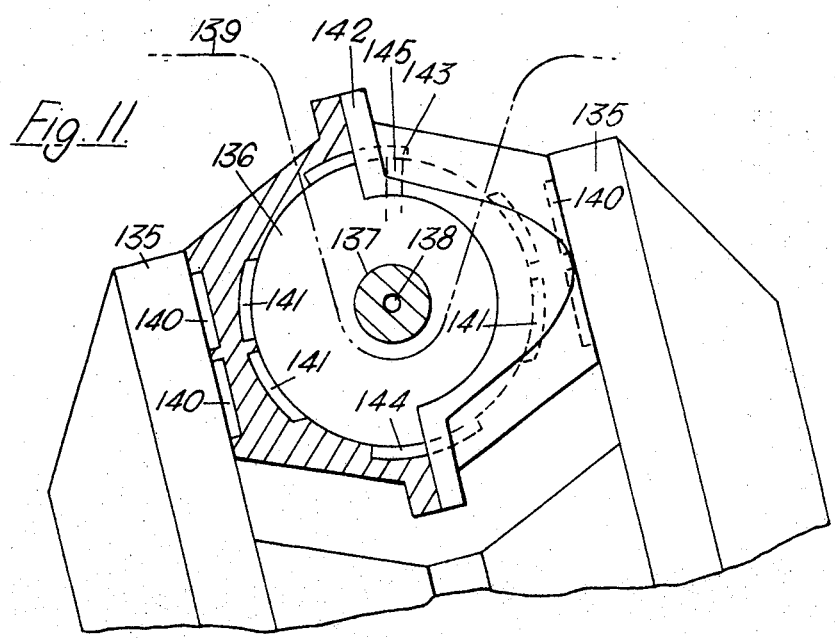
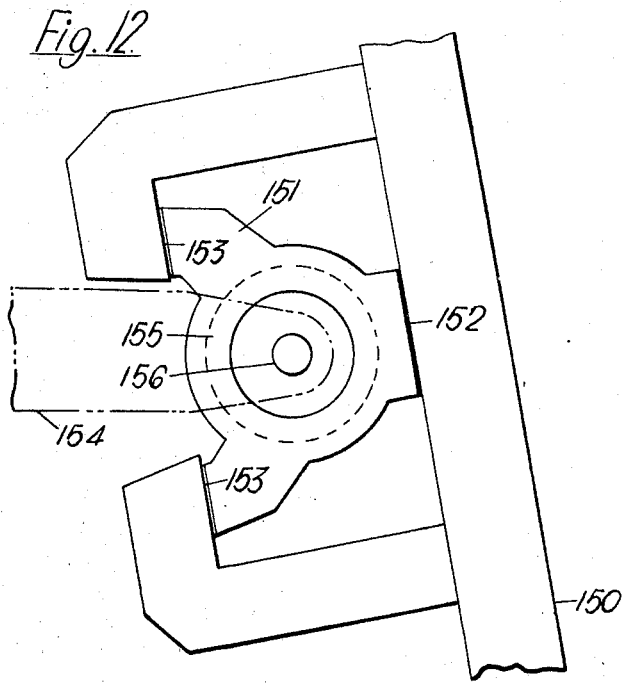

July 28, 1970  J. C. ORKNEY  3,521,614
RECIPROCATING MACHINES

Filed Sept. 29, 1967  7 Sheets-Sheet 6

*Inventor*
JOHN CARNEGIE ORKNEY
Mason, Fenwick & Lawrence
By
*Attorneys*

July 28, 1970  J. C. ORKNEY  3,521,614
RECIPROCATING MACHINES

Filed Sept. 29, 1967  7 Sheets-Sheet 7

Inventor
JOHN CARNEGIE ORKNEY
By Mason, Fenwick & Lawrence
Attorneys

United States Patent Office 3,521,614
Patented July 28, 1970

3,521,614
RECIPROCATING MACHINES
John Carnegie Orkney, The Coach House, Drummond Place Lane, Stirling, Stirlingshire, Scotland
Filed Sept. 29, 1967, Ser. No. 671,683
Claims priority, application Great Britain, Oct. 6, 1966, 44,788/66
Int. Cl. F01m *1/00;* F02b *75/26;* G05g *1/00*
U.S. Cl. 123—196                                  15 Claims

ABSTRACT OF THE DISCLOSURE

A reciprocating heat engine including a swashplate or cam for converting the reciprocating motion of the piston or pistons into rotational movement and a slipper pad assembly connecting the piston rods with the swashplate or cam, the assembly including single or multiple pool hydrostatic bearings supplied with high pressure lubricant.

---

The present invention concerns improvements in, or relating to, reciprocating machines.

This invention concerns especially, but not exclusively, machines, diesel engines, spark ignition engines, steam engines and compressors, which employ reciprocating pistons moving within cylinders, such machines being referred to hereinafter, for convenience, as reciprocating heat engines.

According to the present invention there is provided a reciprocating heat engine including a cylinder, a swashplate or cam, a piston, a piston rod or carrier fixedly attached to the piston, and a slipper pad assembly connecting the piston rod with the swashplate or cam, said slipper pad assembly including a hydrostatic bearing including a lubricant pool adapted to be supplied from a high pressure lubricant source.

Embodiments of the invention will now be described by way of example with reference to the accompanying diagrammatic drawings, of which FIG. 1 is a sectional elevation, on the line I—I of FIG. 2, of an embodiment in the form of an engine having three cylinders and including a swashplate;

FIG. 6a is an elevational view of a modified cam wheel;

FIG. 7 is a part sectional view on the lines III—III, IV—IV of FG. 6;

FIG. 8 is a sectional elevation illustrating a swashplate and slipper pad assembly suitable for use in any one of the engines shown in FIGS. 1–4;

FIG. 11 is a side elevational view partially in section of a modified swashplate and slipper pad assembly;

FIG. 12 is an elevational view of another modified swashplate and slipper pad assembly;

Figure 1:
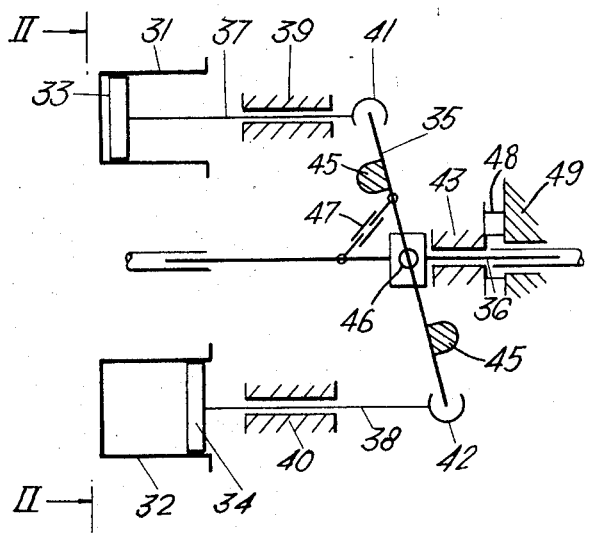
Figure 2:
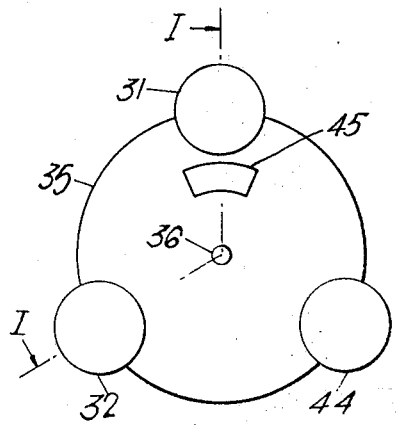
FIG. 2 is an end elevation in the direction of arrows II—II of FIG. 1.

FIG. 1 shows a sectional elevation on the line I—I of FIG. 2, with two of the cylinders 31 and 32 in which pistons 33 and 34 operate. The swashplate 35 is mounted on the shaft 36. The piston rods 37 and 38 are guided in slides 39 and 40, and attached to the piston rod ends are the slipper pad assemblies 41 and 42. A combined journal and thrust bearing, the latter being hydrostatic, is indicated at 43.

FIG. 2 shows an end view, in the direction of line II—II of FIG. 1, of the three cylinders, 31, 32 and 44, and the swashplate 35 on shaft 36. As shown in FIG. 1, the swashplate 35 may be pivotally mounted at 46 on the shaft 36 and an adjustable link 47 may be provided between the swashplate 35 and shaft 36, an alteration in length of the link 47 varying the angle between the swashplate and the shaft.

Balance bobs 45 may be provided on the swashplate 35.

FIG. 1 shows also the provision for altering the axial distance between the swashplate 35 and the cylinders 31 and 32. A packing piece or hydraulic ram 48 permits alteration in the axial location of shaft, swashplate and reciprocating assemblies by altering the axial location of the bearing 43 relative to the engine frame 49.

In the case of a four-stroke engine cycle, three cylinders is the minimum number, in the configuration of FIGS. 1 and 2, which gives a smooth and regular firing order, and which can also be fully balanced dynamically. Axial inertia forces are inherently balanced for two or more cylinders, but a two cylinder engine of this style would produce an unbalanced alternating couple, while for three or more cylinders equally spaced around a common pitch circle and having reciprocating assemblies of equal mass, a rotating unbalanced couple is produced, which can however be fully balanced out by a pair of balance bobs rotating with the shaft. The mass, radius and axial spacing of the balance bobs are functions of the number, the mass and the pitch circle radius of the reciprocating assemblies.

Although any convenient number of cylinders may operate in conjunction with one swashplate, for four-stroke engines, an odd number of cylinders is desirable in order to give a regular firing sequence. Further five-cylinder and seven-cylinder engines are also completely dynamically balanced by the addition of two balance bobs.

Figure 3:
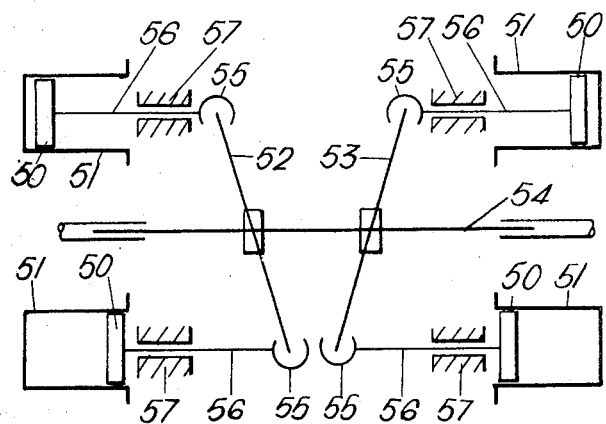
FIG. 3 is a sectional elevation of an engnie having two pairs of opposed cylinders and including two swashplates.

A flat-four configuration is possible as in FIG. 3, in which four pistons 50 operate in four cylinders 51 in conjunction with two swashplates mounted opposed as shown on shaft 54. Slipper pad assemblies 55 operate with the swashplates 52 and 53 and are attached to piston rods 56 guided in slides 57. This configuration is inherently balanced without the need for balance bobs and can give a regular firing order for a four-stroke cycle. Pairs of cylinders can be added at the pitch circle to this opposed swashplate layout without impairing balance or firing regularity, and the same is true of a simple twin cylinder design, provided that in this case the cylinder axes are in line.

The two swashplates 52 and 53 of FIG. 3 may be replaced by a single swashplate, in this case the piston rods 56 of opposing pairs of cylinders have their axes coincident and share a common slipper pad 55. Balance bobs are necessary additions to the swashplate shaft 54 to provide complete balance.

In the engine or compressor layouts indicated in FIGS. 1, 2 and 3 and described above, valves, cooling systems and fuel or gas handling equipment are conventional and so are not shown. In the case of a poppet valve four-stroke engine, valve operation can be by cams mounted on discs rather than on the straight shafts used on in-line engines.

Figure 4:
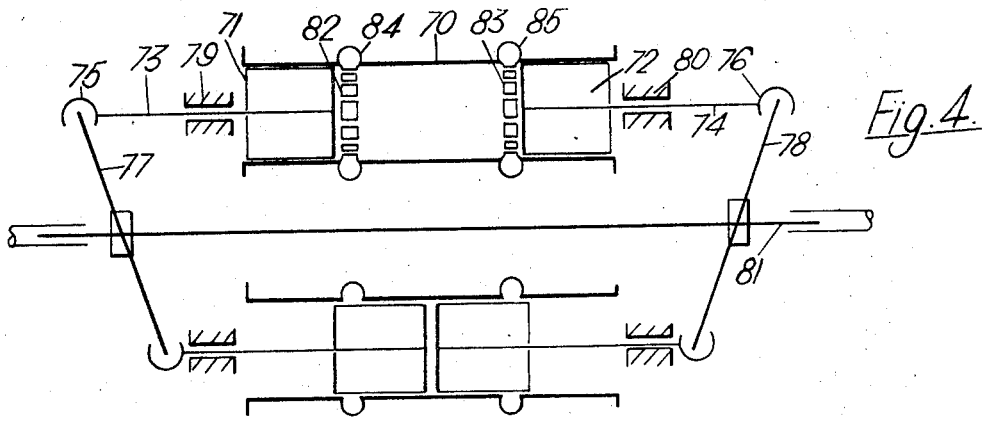
FIG. 4 is a sectional elevation of an opposed piston and swashplate layout.

FIG. 4 shows an opposed piston, twin swashplate layout suitable for use with the ported uniflow two-stroke cycle. This layout offers complete balance for any number of cylinders, including the case where one or more cylinders are of different bore or are mounted at differing radii as may be desired, for example in a multi-stage compressor or a reciprocating scavenger-blower for use as part of an internal combustion engine. Such blowers can be opposed piston units, or pairs of single acting or double acting single piston units, and all may be driven from the main swashplates, or directly from the piston rods. Cylinder 70 contains two pistons 71 and 72 to which are attached piston rods 73 and 74 guided in slides 79 and 80, and having slipper pad assemblies 75 and 76 operating against swashplates 77 and 78 mounted on shaft 81. Near the outer end of their strokes, pistons 71 and 72 uncover exhaust and inlet ports 82 and 83, which open into manifolds 84 and 85. It is possible to create a difference in the timing of opening and closing the ports by alternations to the phasing of one swashplate 77 relative to the other 78. In this design, the pistons 71 and 72 must be long enough to cover the ports when the pistons are at their inner dead centres.

A similar arrangement as described in FIG. 4 can be utilised for an opposed piston, sleeve valve, uniflow, two-stroke engine. In this case the cylinders each have movable sleeves at either end, into or past which short pistons travel near the outer end of their strokes and which then open and close in the desired sequence and timing to allow gases to flow to and from manifolds. The opening and closing of the sleeves may be by axial movement, although rotation to allow ports to open would be equally effective, either system being controlled, for example, by cams on the shaft or swashplates, and so giving more precise control of timing than is possible in the simple ported two-stroke of FIG. 4. Blower or scavenger arrangements can be similar to those described for FIG. 4. Other advantages of the slide valve design include a reduction in the effect of carbon deposits which form in the ports of ported two-stroke diesel engines, this improvement being enhanced if the valve operating mechanism makes the sleeve rotate slightly on its seat as it closes; the possibility of cooling valves as well as pistons with oil jets; the elimination of the need for valves to withstand peak cylinder pressure or temperature; and the reduced friction of the short piston, there being no need for piston skirts to cover ports when the pistons are at inner dead centre.

Figure 5:
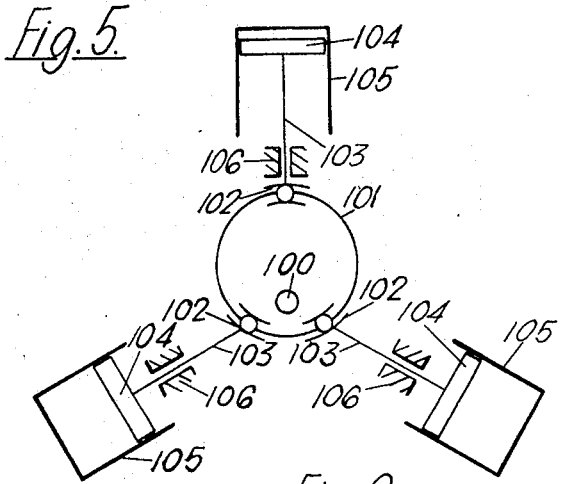
FIG. 5 is a diagrammatic view of a three cylinder radial arrangement.
Figure 6:
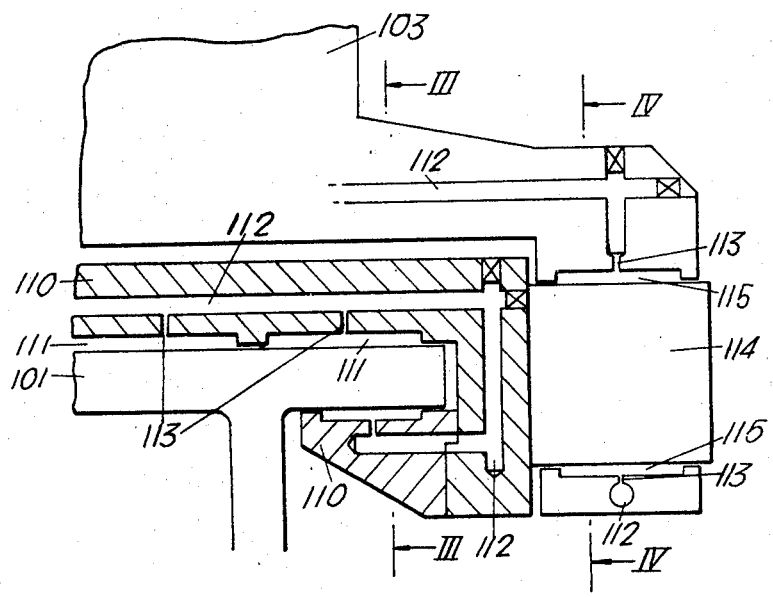
FIG. 6 is a partial sectional view of a slipper pad assembly for use in an engine as illustrated in FIG. 5.

FIG. 5 shows a diagrammatic view of one bank of a three-cylinder radial arrangement in which the shaft 100 carries a cylindrical cam wheel 101 having an outer rim shown in FIG. 6 as being a plain cylinder on both inner and outer surfaces. Alternatives to this include double conical forms on one or both surfaces, or a toroidal form. Hydrostatic slipper pad bearing assemblies 102 operate in conjunction with these surfaces, being attached to piston rods 103 carrying pistons 104 operating in cylinders 105, the rods being guided in slides 106.

This style of construction can be used with V, in line, flat opposed, radial or banked radial engine forms.

FIG. 6 shows a sectional view of a slipper pad assembly as 102, operating on the rim of a cylindrical cam wheel 101 as in FIG. 5 and FIG. 7 shows part sectional views on the lines III—III and IV—IV of FIG. 6. The slipper pads 110 have hydrostatic pockets or pools 111 operating against the surfaces of the cam wheel 101, the oil being supplied through drillways 112 and the chokes or orifices 113 which are normal to hydrostatic bearings. The trunnions 114 are also shown here to have hydrostatic bearings with pools 115, although rolling element bearings or plain bushes are possible alternatives at this point.

FIG. 6a shows a conical cam 101a which is equivalent to the cylindrical cam 101 of FIGS. 5 and 6.

FIG. 8 shows a sectional view of a complete reciprocating assembly consisting of piston 120, piston rod 121 and slipper pad assembly 122 and 124. The piston 120 is short and strongly ribbed internally and the piston rod 121, here shown as a tube with flanged ends, is bolted to the piston and to the casing 122 of the slipper assembly. The inside of the casing 122 is machined to create a spherical recess inside which the spherical slipper pad 124 can swivel to suit the angularity of the swashplate in all its positions. Hydrostatic pools 125 and 126 are provided to prevent contact between the slipper 124 and the swashplate 123 and casing 122 respectively, the swashplate running through a slot cut across the slipper sphere 124. Since the various forces on it are coincident at this point, the reciprocating assembly slide bearings form part of the casing 122 and their hydrostatic pools are shown at 127. The oil supply to these bearings enters a drillway system from a pump 119 through feed tube 128 which is static and slides in hole 129 of FIG. 15 with fine clearance.

Figure 9:
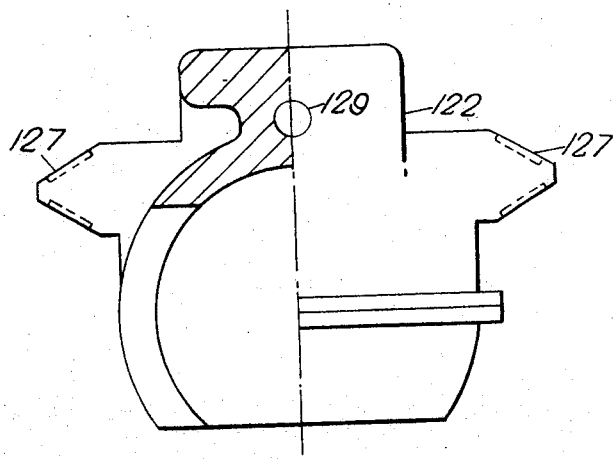
FIG. 9 is a part outside and part sectional view of the lines V—V and VI—VI of FIG. 8.

FIG. 9 is a part outside and part sectional view of casing 122 on the lines V—V and VI—VI of FIG. 8. The oil supply to the pools 125 from hole 129 is by way of drillways 130 and restrictors 131, while the oil supply to pools 125 is by way of drillway 132 pocket 133, which is not a hydrostatic pool, drillways 134 formed in the pad 124 and restrictors 135.

Figure 10:
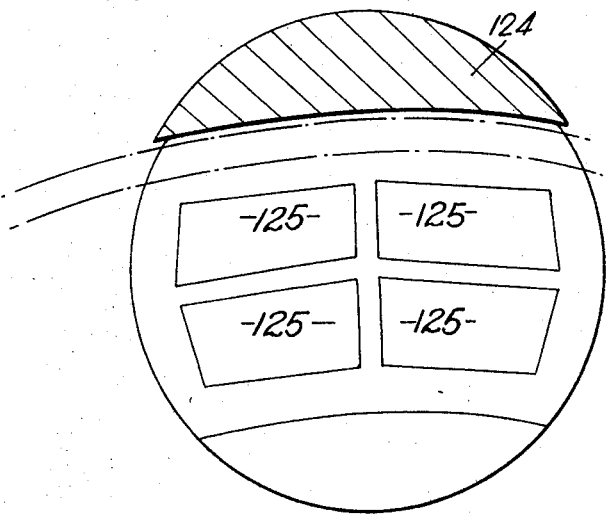
FIG. 10 is a sectional view on the line VII—VII of FIG. 8.

FIG. 10, which is a sectional view on the line VII—VII, of FIG. 8 and shows the position and extent of the pools 125 in the pad 124.

FIG. 11 shows a slipper in which the swashplate has two flanges 135 with running surfaces facing each other and between which the slippers 142 are swivel mounted on a sphere 136 which is carried on fixed trunnions 137 attached to slide carrier 139. In this figure it is possible to show the lubricant transfer means from carrier to slipper bearing. The drillways in the carrier conduct oil through the hole 138 in the trunnions into the sphere. A hole 145 in the top of the sphere, which may be solid or hollow, allows oil to flow freely into pocket 143 in the slipper assembly 142. This pocket is not a hydrostatic pool as no inlet restrictor is present. Its dimensions are dictated by the swivel angle of the slipper. From this pocket, drillways in the slipper assembly 142 conduct oil to the hydrostatic pools 140 and 141, which act respectively against the swashplate and the sphere, and to hydrostatic pool 144 which counters the load created at pool 143 and also controls the clearances around and so the leakage from this pool 143.

FIG. 12 shows a modification to the slipper of FIG. 17 in which the slipper assembly 151 runs in a partially enclosed track in the swashplate 150 with slipper bearing 152 running on one track and bearings 152 split symmetrically and running on two tracks facing the first. This assembly 151 is again swivel mounted on a sphere 155 having trunnions 156 attaching it to carrier 154. Hydrostatic bearings are provided as before.

Figure 13:
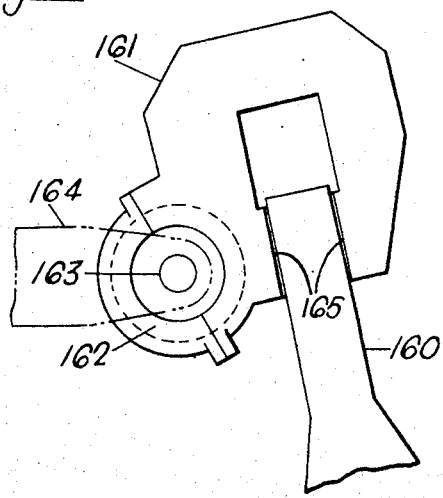
FIG. 13 is an elevational view of still another modified swashplate and slipper pad assembly.

FIG. 13 shows a simple swashplate 160 operating in conjunction with a hydrostatic slipper assembly 161 which is again swivel mounted on a sphere 162 carried on trunnions 163 from carrier 164. The slipper bearing surfaces are shown at 165 and are lubricated hydrostatically.

Figure 14:
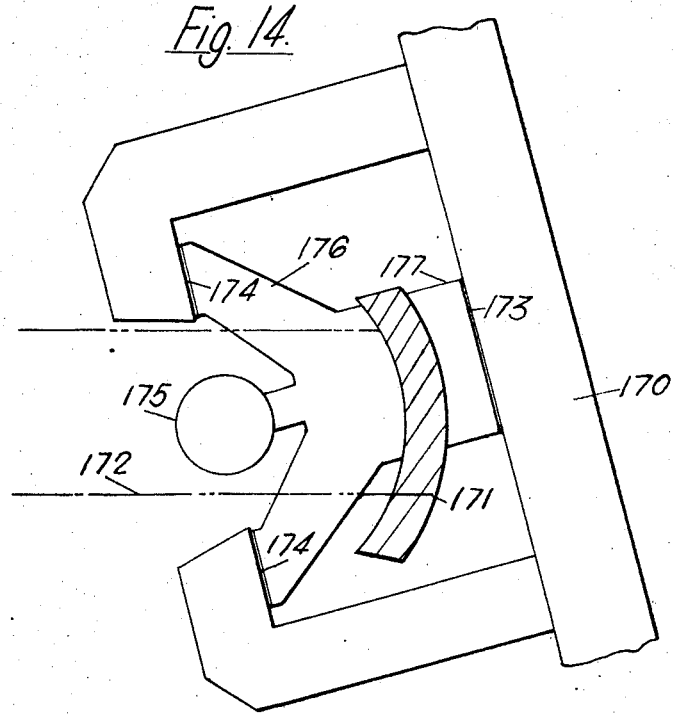
FIG. 14 is an elevational view of another modified swashplate and slipper pad assembly and is partially in section.

FIG. 14 shows an enclosed track swashplate 170 as in FIG. 12 in which an alternative to the trunnion mounted sphere of FIGS. 11 to 13 is provided by the use of part of a hollow sphere 171 whose inner and outer radii have a common centre which is also the centre of small sphere 175 whose function is to accept the oil transfer and balancing arrangements (not shown) from the legs of carrier 172. The spherical plate 171 is solidly mounted on carrier legs 172 while the sphere 175 is mounted on one part, 176, of the slipper assembly. This part, 176, has hydrostatic slipper bearings at 174 and against plate 171, both fed with oil via sphere 175. Oil is transferred to the other slipper part 177 for use at 173 and against the outer surface of plate 171 by a pipe connection (not shown) between parts 176 and 177. Transfer arrangements at sphere 175 may be axial instead of lateral and may use mechanical seals in place of fine leakage clearances.

As an alternative to swivel mountings using spherical surfaces, the required motion can be provided by a gimbal mounting, wherein two sets of cylindrical, taper or conical bearings, whether plain bushes, hydrostatic or rolling element bearings, have their axes intersecting at right angles at the point about which a swivel action is required.

Figure 15:
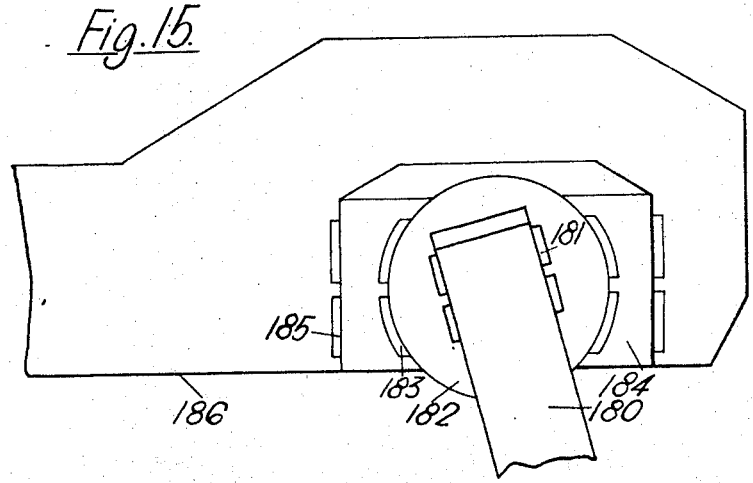
FIG. 15 is an elevational view of another modified swashplate and slipper pad assembly.

FIG. 15 shows a possible layout of this type for use with a simple swashplate 180. Hydrostatic slipper bearings are required against the swashplate and their pools are shown at 181, formed in part 182 whose outside diameter is cylindrical or double conical for location, and where further bearing pools 183 are shown. These pools are formed in part 184 which is again mounted in cylindrical or double conical bearings, the pool being shown at 185 in the main body of the assembly. Transfer ports in an assembly of this kind become slots cut circumferentially part way round each cylinder and facing a hole in the opposite part. Pressure loads can be accommodated in the main pool design or by separate pools.

Figure 16:
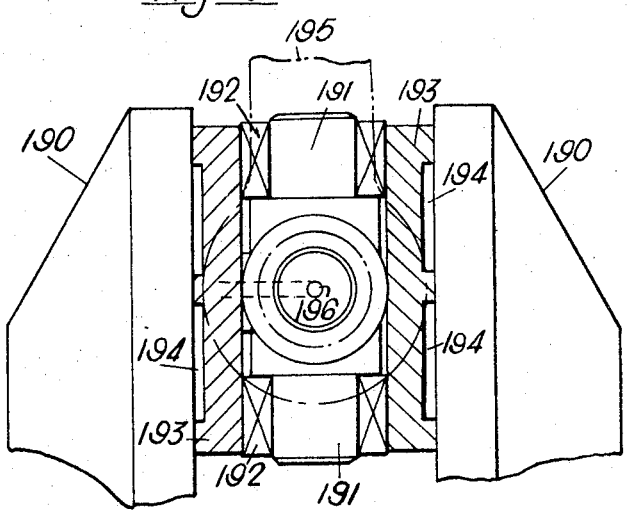
FIG. 16 is an elevational view of a double trunion arrangement.

FIG. 16 shows an elevation 17 of a gimbal or double trunnion arrangement using needle roller bearings 192 for rotary motions and hydrostatic slipper pads 193 against the swashplate flanges 190.

The needle roller bearings 192 are mounted on the trunnions 191, one pair of bearings being clamped between the two slipper pads 193 while the other pair fit into recesses in the carrier legs 195. The slipper pad hydrostatic bearings have pools at 194 and are fed through drilled passages 196 in carrier legs and trunnion cross.

The thrust loads accepted by hydrostatic bearings are a function of lubricant pressures and pad geometry. It is also known that a simple circular pool surrounded by a constant width annular land can generate a tilting moment whereby it will, to some extent, resist any other forces tending to make one edge of the bearing lift and the opposite edge to make contact. The geometrical requirements for maximum tilting moment conflict with those for maximum thrust capacity. It is for this reason that multiple pool assemblies are provided in the above-described embodiments, it being possible to design such assemblies to create greater tilting moments than can be generated by a comparable single pool device. This is necessary in high speed engines in order to overcome the inertias of the slipper pad assemblies.

Several types of lubricant pump and control arrangements are available and suitable for supplying these bearings, from a simple low pressure gear pump with pressure releif valve, to a variable flow axial piston pump with constant pressure stall valve control and with its inlet boosted by gear pump. A combination of both these arrangements would suit some applications, with auxiliary plain bearings or low pressure hydrostatic bearings, such as might be used to locate accurately the sleeve valves of the opposed piston sleeve valve engine being supplied by the gear pump which also boosts the high pressure pump inlet. During operation of the engine, such pumps would be engine driven, but provision must be made for an alternative drive to them, or for pressure lubricant to be supplied from a separate pump prior to starting up the engine.

Filtration is important in any hydraulic equipment and a combination of replaceable element filters with centrifugal and magnetic filters may be required.

I claim:

1. A reciprocating heat engine including a cylinder, a piston, a piston rod fixed against rotation to the piston, a cam, a high pressure lubricant source, and a slipper pad assembly connecting the piston rod to the cam, said slipper pad assembly including a hydrostatic bearing having a plurality of lubricant pools, each pool being provided with a connection with the high pressure lubricant source and including a fluid restrictor in said connection.

2. A reciprocating heat engine as claimed in claim 1 in which the slipper pad assembly includes a spherical swivel hydrostatic bearing.

3. A reciprocating heat engine as claimed in claim 1, in which the slipper pad assembly includes a cylindrically hydrostatic swivel bearing.

4. A reciprocating heat engine as claimed in claim 1, in which the slipper pad assembly includes double cylindrical, hydrostatic swivel bearings.

5. A reciprocating heat engine as claimed in claim 1, in which the slipper pad assembly includes a conical hydrostatic swivel bearing.

6. A reciprocating heat engine as claimed in claim 1, in which the slipper pad assembly includes a double conical hydrostatic swivel bearing.

7. A reciprocating heat engine as claimed in claim 1, including a plurality of cylinders arranged equi-spaced around a common pitch circle with their axes mutually parallel to the axis of rotation of the cam which is a swashplate.

8. A reciprocating heat engine as claimed in claim 1, in which the piston rods or carriers are supported and guided in slides, by hydrostatic bearings.

9. A reciprocating heat engine as claimed in claim 1, in which the high pressure lubricant source is a pump, and transfer means are provided for supplying lubricant from the fixed to the moving parts of the engine, said transfer means including a fixed supply pipe extending through a gland in a reciprocating part of the engine and discharging into a lubricant reservoir in said reciprocating part, drillways provided in the reciprocating part and communicating with the hydrostatic bearings supplying lubricant from the reservoir to said bearings.

10. A reciprocating heat engine as claimed in claim 7, in which the means are provided for altering the angle between the swashplate and the shaft on which it is mounted.

11. A reciprocating heat engine as claimed in claim 10, in which balance bobs are provided rotating with the shaft.

12. A reciprocating heat engine as claimed in claim 7, in which means are provided for altering the axial distance between the swashplate and cylinder or cylinders.

13. A reciprocating heat engine as claimed in claim 1, including a plurality of cylinders with their axes arranged radially, the ends of the piston rods of each cylinder being provided with a slipper pad which connects the rod to the cam which is a circular cam, the centre of gyration of which is co-incident with the point of intersection of the piston rod axes.

14. A reciprocating heat engine as claimed in claim 13, in which the surface of the cam is cylindrical.

15. A reciprocating heat engine as claimed in claim 13, in which the surface of the cam is conical.

References Cited

UNITED STATES PATENTS

| | | |
|---|---|---|
| 1,694,938 | 12/1928 | Harris. |
| 2,752,214 | 6/1956 | Ferris _____ 74—579 |
| 2,821,145 | 1/1958 | Douglas. |
| 2,825,241 | 3/1958 | Ferris _____ 74—579 |
| 3,106,138 | 10/1963 | Thoma _____ 92—156 |
| 3,216,333 | 11/1965 | Thoma _____ 92—156 XR |

WENDELL E. BURNS, Primary Examiner

U.S. Cl. X.R.

74—579; 92—153; 123—58, 197; 184—6